United States Patent

Schneider et al.

[11] Patent Number: 6,025,710
[45] Date of Patent: Feb. 15, 2000

[54] CONNECTION ARRANGEMENT BETWEEN A SENSOR AND CONNECTION LEADS

[75] Inventors: Thomas Schneider, Markgroeningen; Roland Schmid, Dettingen; Reinhold Jocham, Hechingen; Thomas Ullmann, Backnang; Hans-Juergen Herderich, Kernen, all of Germany

[73] Assignee: Robert Bosch GmbH, Stuttgart, Germany

[21] Appl. No.: 08/468,487

[22] Filed: Jun. 6, 1995

[30] Foreign Application Priority Data

Jun. 30, 1994 [DE] Germany ............................ 44 22 951

[51] Int. Cl.[7] .................. G01B 5/12; G01P 3/48; G01P 3/54
[52] U.S. Cl. ............................................... 324/173
[58] Field of Search ........................ 324/173, 174, 324/207.13, 207.15, 207.25, 262, 229, 230, 72.5, 754, 133, 696, 445, 446

[56] References Cited

U.S. PATENT DOCUMENTS

| | | | |
|---|---|---|---|
| 3,525,939 | 8/1970 | Cartmell | 324/72.5 |
| 3,716,787 | 2/1973 | Hammond | 324/173 |
| 3,976,954 | 8/1976 | Sapir | 330/69 |
| 4,005,360 | 1/1977 | Ott | 324/230 |
| 4,283,679 | 8/1981 | Ito et al. | 324/174 |
| 4,408,159 | 10/1983 | Prox | 324/207.16 |
| 4,651,241 | 3/1987 | von der Heide et al. | 324/173 |
| 4,683,427 | 7/1987 | Durum | 324/207.15 |
| 4,732,034 | 3/1988 | Bjorn | 324/173 |
| 4,829,245 | 5/1989 | Echasseriau et al. | 324/207.15 |
| 4,994,739 | 2/1991 | Honda et al. | 324/173 |
| 5,001,436 | 3/1991 | Scot et al. | 324/696 |
| 5,021,737 | 6/1991 | Schutts | 324/262 |
| 5,053,703 | 10/1991 | Fischer | 324/230 |
| 5,140,261 | 8/1992 | Seo et al. | 324/174 |
| 5,399,978 | 3/1995 | De Kort et al. | 324/72.5 |
| 5,416,410 | 5/1995 | Kastler | 324/174 X |
| 5,422,568 | 6/1995 | Hashizume et al. | 324/174 X |
| 5,483,156 | 1/1996 | Nishihara | 324/173 |

*Primary Examiner*—Walter E. Snow
*Attorney, Agent, or Firm*—Kenyon & Kenyon

[57] ABSTRACT

In a connection arrangement between a sensor and connection leads, only a small installation space is required. To this end, the connection arrangement has a signal amplifier, which is electrically contacted by means of bond connections with the sensor and the connection leads. This is achieved by means of connecting elements, which are designed as thin sheet-metal shaped parts and are fixed with tab-shaped end sections in a housing of plastic, in which the signal amplifier is also inserted. The end sections, the signal amplifier, and the bond connections are arranged in a space-saving manner in roughly one plane. The connection arrangement is especially suited for sensors used to measure the speed of motor vehicles.

13 Claims, 1 Drawing Sheet

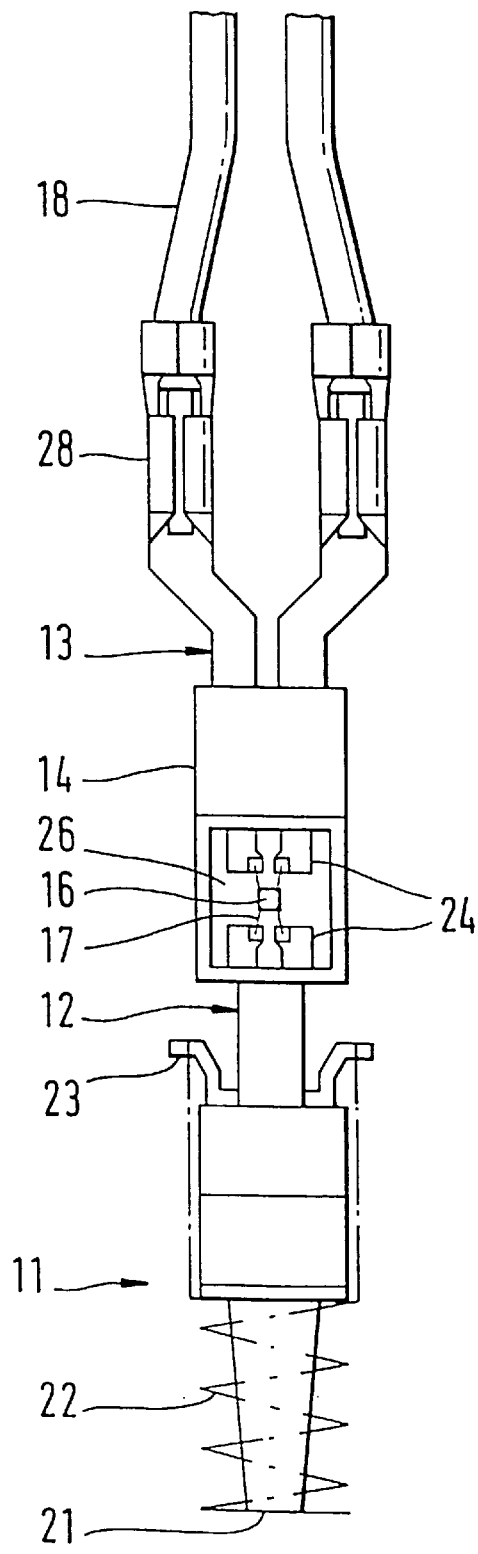
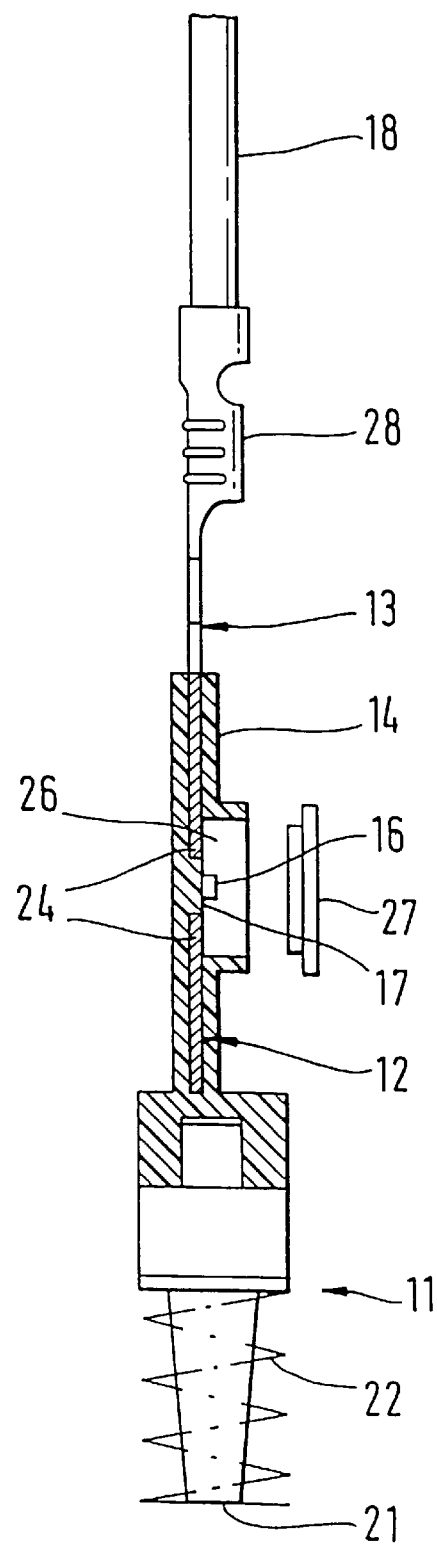

CONNECTION ARRANGEMENT BETWEEN A SENSOR AND CONNECTION LEADS

BACKGROUND INFORMATION

As is generally known when sensors are used to measure the speed of motor vehicles, connection arrangements are often realized as plug-in connections. These connection arrangements have an encapsulated type of design, because, as a rule, the sensors are mounted on the chassis frame where the serious effects of wetness and dirt have to be expected. Accordingly, the connection arrangements have an undesirably large volume, which is an obstacle to an alternative method of mounting the sensors, such as on the wheel bearing.

SUMMARY OF THE INVENTION

The connection arrangement according to the present invention has the advantage of avoiding the aforementioned shortcoming. To this end, an electrical signal amplifier is arranged between the sensor and the connection leads and is further electrically connected by means of bond connections. In this manner, it is possible to have a small sensor design and to realize an especially compact type of connection, thus making it possible to assemble the sensor in alternative installation spaces.

In a particularly advantageous embodiment, a connection arrangement according to the present invention runs nearly in one plane and has only a small unit volume.

BRIEF DESCRIPTION OF THE DRAWINGS

FIG. 1 shows the connection arrangement according to the present invention arrangement in a top view.

FIG. 2 shows the connection arrangement of FIG. 1 in a partially-cut-away side view.

DETAILED DESCRIPTION

Referring to FIGS. 1 and 2, a connection arrangement according to the present invention has a sensor 11 as a main component, first and second connecting elements 12, 13, a housing 14, a signal amplifier 16, bond connections 17, and connection leads (lines) 18.

The sensor 11 for measuring the speed of a motor vehicle is designed as a pot-shaped inductive sensor. It contains a cylindrical pole core 21 and a coil 22 disposed coaxially to the pole core. In a generally known way that is not shown here, the sensor 11 is supported in a stationary part of the motor vehicle and its pole core 21 is directly adjacent, on the front side, to a pulse generator wheel that is coupled to a wheel of the motor vehicle. The sensor 11 converts the angle of rotation of the wheel into an electric pulse string.

The winding ends of the coil 22 are contacted at connection hooks 23 by the first connecting elements 12 that are connected to the coil 22, for example by means of soldering or welding.

The first connecting elements 12 are designed as thin-walled sheet-metal shaped parts, as are the second connecting elements 13 associated with the connection leads 18, which are punched as a one-piece part in the form of a lattice out of a sheet-metal strip, sheathed with plastic for insulation purposes and cut apart by removing auxiliary webs.

The connecting elements 12, 13 have tab-shaped end sections 24, which are arranged in pairs and so oriented that, lying in one plane, they oppose one another on the front side with little clearance. They are fixed in this position by the housing 14, which is formed by a plastic injection molding process, in which the end sections 24 are introduced as insertable parts into the plastic die.

The flat, cuboidal housing 14 has an opening 26, through which the signal amplifier 16 is introduced in the form of a thin, flake-shaped integrated circuit into the housing 14 between the end sections 24 and is fixed here, for example, by means of adhesive.

In the end regions of the signal amplifier 16 having a more or less square surface area, contact regions are formed (not shown in greater detail), of which one bond connection 17 is drawn out to an associated end section 24. These bond connections 17 are formed with a very thin wire, which has a diameter of 0.03 mm, for example, and is preferably electrically contacted by means of friction welding at a suitable contact surface, for example made of aluminum, nickel or gold. The bond connections 17 run nearly in the same plane as the end sections 24 and the signal amplifier 16, so that this type of connection can have an especially compact design.

The opening 26 is able to be sealed by a cover 27, for example by means of ultrasonic welding or adhesion.

At the end regions facing the connection leads 18, the second connecting elements 13 are designed as crimp connectors 28, where the ends of the connection leads 18 can be electrically contacted in a well known manner.

Alternatively, and in an especially space-saving manner, these end regions of the second connecting elements can also have a half-shell form, and the ends of the connection leads 18 can be integrally connected to them.

The described connection arrangement requires only a small unit volume and makes it possible to assemble the sensor 11 in alternative installation spaces, for example in a wheel bearing.

In adaptation to these installation spaces, the sensor 11 and/or the connection leads 18 can be installed in true alignment with or offset at an angle from the remaining connection arrangement, and the sensor 11, together with the connection arrangement, can be protected from moisture in a special way by a shared plastic sheathing.

What is claimed is:

1. A connection arrangement for coupling a sensor to at least one connection lead, comprising:
    at least one first connecting element coupled to the sensor;
    a housing coupled to the sensor;
    at least one second connecting element coupled to the connection lead;
    an electrical signal amplifier arranged between the sensor and the connection lead; and
    at least one thin wire bond connection coupling the amplifier to each of the first and second connecting elements, wherein the housing encases the electrical signal amplifier and the at least one thin wire bond connection and wherein the sensor is located outside of the housing.

2. The connection arrangement according to claim 1, wherein the amplifier includes a thin, plate-shaped integrated circuit.

3. The connection arrangement according to claim 1, wherein the first and second connecting elements include first and second tab-shaped end sections, respectively.

4. The connection arrangement according to claim 3, wherein the amplifier, the end sections, and the bond connection are disposed approximately in one plane.

5. The connection arrangement according to claim 4, wherein the housing contains the tab-shaped end sections, the amplifier being fixed adjacent to the end sections.

6. The connection arrangement according to claim 4, wherein the housing is composed of plastic and has a sealable opening for containing the amplifier.

7. The connection arrangement according to claim 1, wherein the first and second connecting elements are formed of substantially planar sheet-metal, the first connecting element is integrally coupled to the sensor, and the second connecting element is coupled to the connection lead via a crimp connector.

8. The connection arrangement according to claim 1, wherein the sensor is an inductive sensor having a pole core and a coil, the sensor measuring a speed of a motor vehicle.

9. The connection arrangement according to claim 1, wherein the connection arrangement and the sensor are extrusion-coated in one piece with plastic.

10. A connector for connecting a sensor to a lead-in line comprising:

a housing encasing an amplifier and encasing first and second thin wire bond connections, wherein the sensor is outside of the housing;

a first portion having a first end adapted to receive a corresponding end portion of the sensor and a second end extending into the housing and being coupled to the first thin wire bond connection, wherein the first end of the first portion is outside of the housing; and a second portion having a first end adapted to receive the lead-in line and a second end extending into the housing and being coupled to the second thin wire bond connection, wherein the first end of the second portion is outside of the housing;

wherein the first and second portions and the housing are substantially planar and are arranged in substantially the same plane.

11. The connection arrangement according to claim 1, wherein the housing encases only the electrical signal amplifier and a plurality of thin wire bond connections including the at least one thin wire bond connection.

12. The connector according to claim 10, wherein the housing encases only the amplifier and four thin wire bond connections including the first thin wire bond connection and the second thin wire bond connection.

13. The connector according to claim 10, wherein the amplifier is coupled between the first thin wire bond connection and the second thin wire bond connection.

* * * * *